United States Patent [19]

Ferrara, Jr.

[11] Patent Number: 4,901,973

[45] Date of Patent: Feb. 20, 1990

[54] SUPPORT BASE FOR AN AIR TRAFFIC CONTROLLER'S CONSOLE OR THE LIKE

[76] Inventor: Daniel A. Ferrara, Jr., Looking Glass Hill, Bantam, Conn. 06750

[21] Appl. No.: 359,369

[22] Filed: May 31, 1989

[51] Int. Cl.$^4$ .............................................. F16M 13/00
[52] U.S. Cl. ....................................... 248/922; 108/142
[58] Field of Search ............... 248/349, 415, 664, 425, 248/131, 919, 920, 922, 418; 108/139, 142, 94, 104, 103; 384/614, 615, 609

[56] References Cited

U.S. PATENT DOCUMENTS

| | | | |
|---|---|---|---|
| 1,735,321 | 11/1929 | Kilburn | 248/425 |
| 1,741,784 | 12/1929 | Lucas | 248/425 |
| 3,302,594 | 2/1967 | Barnett | 248/349 |
| 3,479,632 | 11/1969 | Galles | 248/349 |
| 4,258,966 | 3/1981 | Grubb, Jr. | 108/139 |
| 4,554,590 | 11/1985 | Chelin | 248/181 |
| 4,564,166 | 1/1986 | Craft | 248/183 |
| 4,575,033 | 3/1986 | Henneberg | 248/185 |

FOREIGN PATENT DOCUMENTS 2107718 9/1972 Fed. Rep. of Germany ...... 108/103

Primary Examiner—Ramon O. Ramirez
Assistant Examiner—Robert A. Olson
Attorney, Agent, or Firm—Dallett Hoopes

[57] ABSTRACT

The invention is a support base for a CRT console, the base comprising at least two stacked generally planar elements having aligned frontal margins with a corner at each end. Pivot means are provided in the corners to permit the upper element to pivot with respect to the lower element about the pivot points selectively. Antifriction means are provided between the upper and lower elements. Restraining means assure that the upper and lower elements will pivot only at one of the pivot points. The restraining means also serve to hold down the rear of the upper element so that the console does not pitch forward and fall as the weight of the console moves forward.

In one embodiment an intermediate element is disposed between the upper and lower elements and the pivot points comprise pins, one pivotally joining the lower element and the intermediate element at one corner and the other joining the intermediate element and the upper element at the other corner.

8 Claims, 2 Drawing Sheets

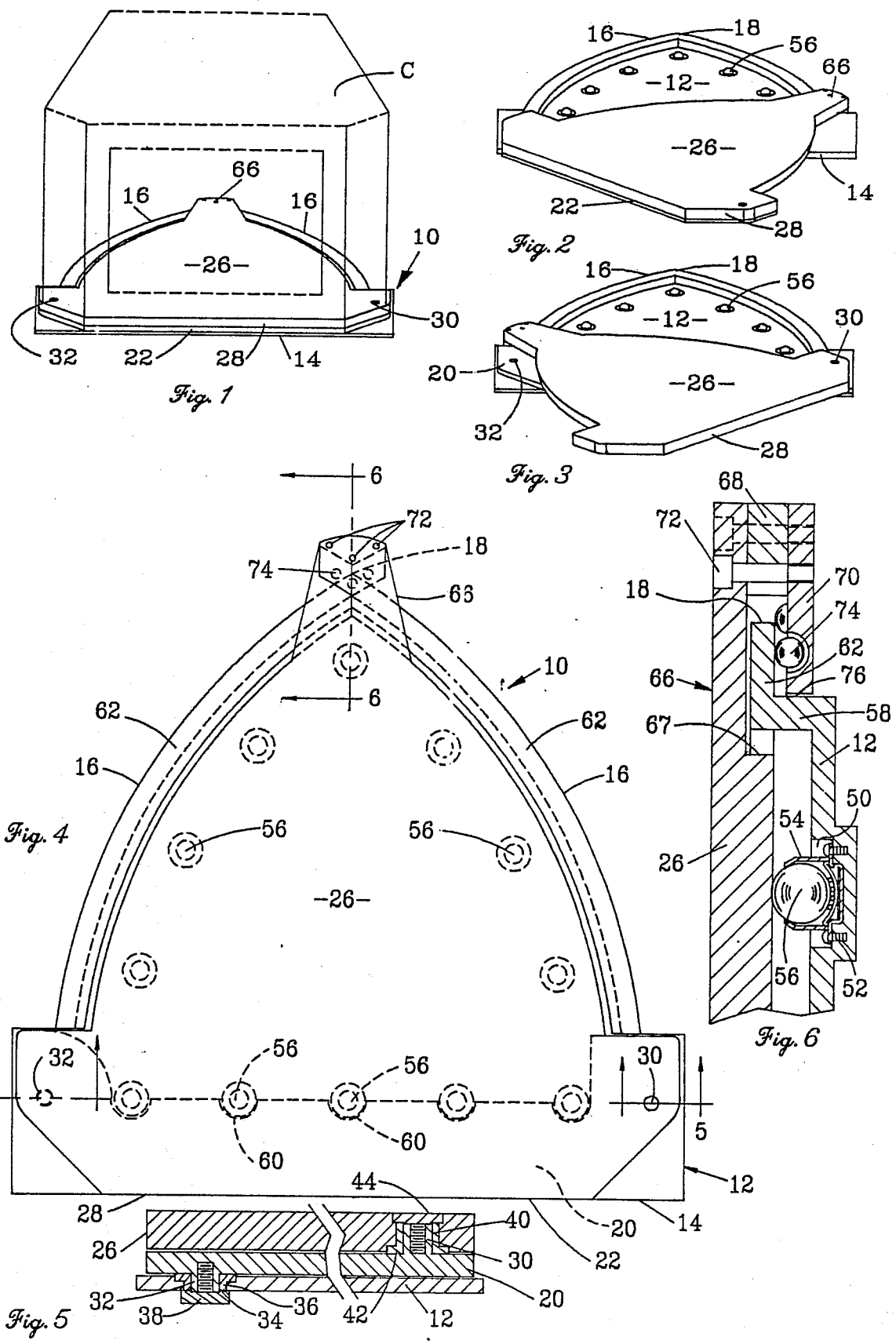

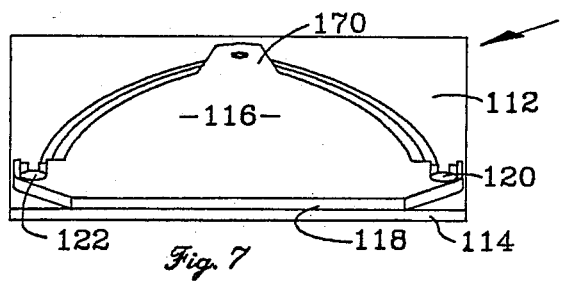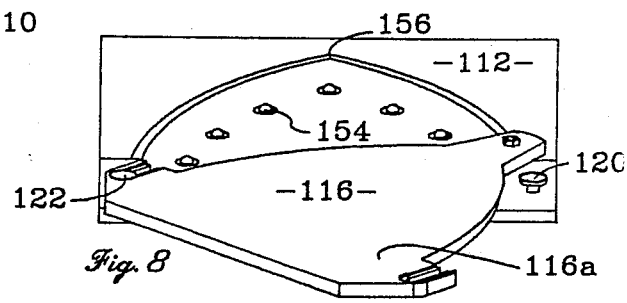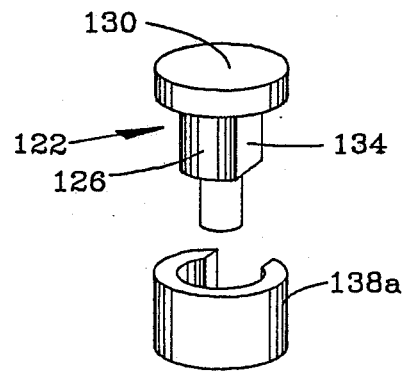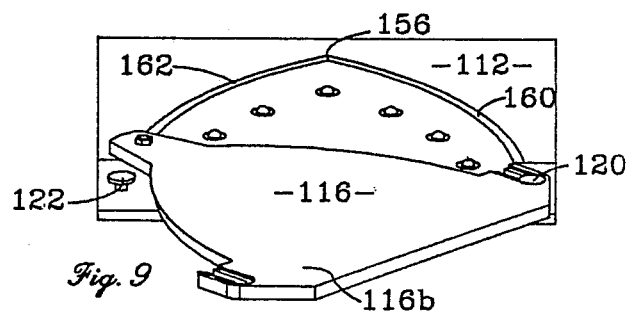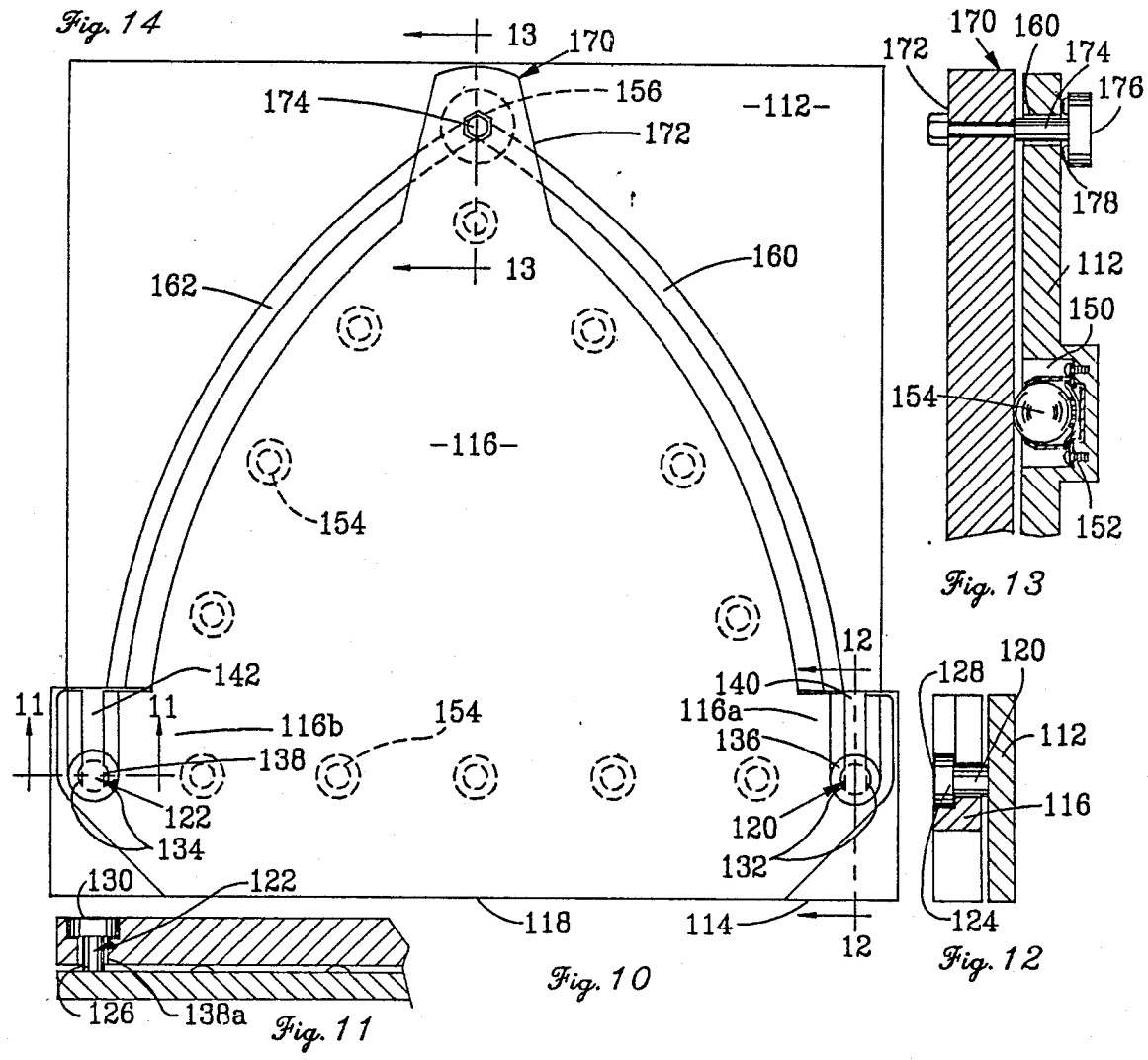

SUPPORT BASE FOR AN AIR TRAFFIC CONTROLLER'S CONSOLE OR THE LIKE

BACKGROUND OF THE INVENTION

1. Field of the Invention

This invention relates to a support base for a CRT display console which permits the pivoting of the console about a vertical pivot axis at a selected front corner of the console. More specifically, the invention relates to a support for an air traffic controller's console which is adapted to permit the console to be pivoted about a selected corner so that the viewing face of the console is disposed at an angle of about 45° with respect to the base.

2. Description of Related Art including Information Disclosed under §§1.97 to 1.99

There is much prior art directed to supports for CRT display terminals, examples are shown in the following. U.S. patents:

U.S. Pat. No. 4,554,590 issued Nov. 19, 1985 to Chaelin et al,

U.S. Pat. No. 4,564,166 issued Jan. 14, 1986 to Craft et al., and

U.S. Pat. No. 4,575,033 issued Mar. 11, 1986 to Hennebert et al.

Each of these, for instance, comprises an upwardly concave base and a downwardly convex upper member which is secured to the bottom of the video terminal and which rides in the upwardly concave base so that the display unit may be pivoted about the vertical axis of the base and also about a horizontal axis roughly across the center of the video device. Thus, there is permitted a universal pivoting about a point approximately in the center of the video terminal.

The above described supports do not meet the longfelt need in an air traffic controller's center for a base that permits the controller's console to pivot selectively about vertical axes at the front corners of the units. This kind of pivoting is needed when controllers, whose sitting positions are fixed, wish to shift the face of a video unit from angling toward one sitting station to angling toward an adjacent sitting station. Put another way, adjacent controllers at fixed sitting stations have need for pivoting a display unit between them so that it alternately faces one or the other of the controllers. It is not sufficient to pivot the console about its center axis as with the above recited prior art patents because a portion of the screen would be partly obscured by the CRT terminal immediately in front of the controller.

SUMMARY OF THE INVENTION

The present invention permits, especially suited to the above environment, the pivoting of a video display device or console about one of its frontal corners to accommodate the needs of adjacent air traffic controllers. The invention is a support base for such a console, the base comprising at least two stacked generally planar elements having aligned frontal margins with a corner at each end. Pivot means are provided in the corners to permit the upper element to pivot with respect to the lower element about the pivot points selectively. Anti-friction means are provided between the upper and lower elements. Restraining means assure that the upper and lower elements will pivot only at one of the other pivot points and also serve to hold down the rear of the upper element so that the console does not pitch forward and fall.

BRIEF DESCRIPTION OF THE DRAWINGS

Other features and objects of the invention will be apparent from the following specification and the drawings, all of which disclose non-limiting embodiments of the invention. In the drawings:

FIG. 1 is a front top perspective view of a base embodying the invention and showing in phantom a console C mounted on the top of the support;

FIG. 2 is a perspective view similar to FIG. 1, without the console, showing the upper element pivoted about the left hand pivot point;

FIG. 3 is a view similar to FIG. 2 showing the upper element pivoted about the right hand pivot point;

FIG. 4 is a top view of a support base embodying the invention;

FIG. 5 is a sectional view taken on the line 5—5, enlarged and broken, of FIG. 4;

FIG. 6 is an enlarged sectional view taken on the line 6—6 of FIG. 4;

FIG. 7 is a perspective view similar to FIG. 1 of a modified form of the invention;

FIG. 8 is a view similar to FIG. 7 but showing the upper element pivoted about the left hand pivot point;

FIG. 9 is similar to FIG. 8 but showing the upper element pivoted about the right hand pivot point;

FIG. 10 is an enlarged top plan view;

FIG. 11 is a fragmentary view taken on the line 11—11 of FIG. 10;

FIG. 12 is a sectional view taken on the line 12—12 of FIG. 10; and

FIG. 13 is an enlarged fragmentary sectional view taken on the line 13—13 of FIG. 10.

FIG. 14 is an exploded view of the pivot pin and bushing.

DESCRIPTION OF THE PREFERRED EMBODIMENT

A support base embodying the invention is generally designated 10 in FIG. 1. It comprises a lower element 12 which may be generally triangular in shape (FIG. 4). Element 12 also has a frontal margin 14 and arcuate rear margins 16 which converge to a point 18 (FIGS. 2,3).

An intermediate element 20 is stacked on top of the lower element 12 so that its frontal margin 22 is aligned right above the frontal margin 14 of the lower element.

Superposing the intermediate element 20 is an upper element 26 having a frontal margin 28 which preferably is aligned with the margins 14 and 22 of the inferior elements.

Adjacent the offset corners of the frontal margins 14, 22, 28 are pivot means comprising pivot pin 30 on the right and pivot pin 32 on the left (FIG. 4). As shown in FIG. 5, the pivot pin 32 extends downward from the intermediate member 20 and passes through an opening 34 in the lower element 14. The opening 34 may be provided with an eyelet or bushing 36 and the pin 32 may be drilled and tapped to receive a threaded head 38 which keeps the parts together.

Because of the fit of bushing 36 with respect to one of its adjacent members the intermediate element 20 is free to pivot about pin 32 with respect to lower element 14. The rightward pivot pin 30 is received into an opening 40 in the upper element 26 and a bushing 42 similar to bushing 36 fits inbetween the two permitting relative rotation of the upper element 26 with respect to the intermediate element 20. A threaded head 44 keeps the parts together.

The lower element 12 (FIG. 6) is formed with a series of spaced pockets 50, each of which mounts a fixture 52 including a shell 54 for rotatably supporting a ball bearing 56. The ball bearing engages the underside of the upper element 26 to provide anti-friction means between the upper and lower elements. It can be seen (FIG. 4) that the intermediate element 20 is notched out as at 60 so as not to interfere with the functioning of the antifriction means 56.

Restraining means are provided at the arcuate margins 16 of the lower element 12. As shown in FIG. 6, they comprise an upupward flange 58 terminating in an offset lip 62. The upper element 26 is provided with a follower comprising an arm 66 extending rearward from the surface of the upper element 26. The arm is recessed to provide a shoulder 67. Adjacent its distal end the arm 66 has secured to it a downward spacer 68 and a re-entrant plate 70. Structurally this arrangement is held together by bolts 72 which extend through the arm 66, the spacer 68 and the re-entrant plate 70. To permit the parts to move with relative ease, the re-entrant plate is provided with ball bearings 74 which are appropriately mounted for rotation on the re-entrant plate and which engage the underside of the lip 62. It should be noted that the free end 76 of the re-entrant arm 70 narrowly clears the flange 58 adjacent the lip 62.

With the structure thus described, it can be seen that the upper element 26 can be pivoted back about either the pivot 30 or 32 to a 45° angle with respect to the lower element 12 in FIGS. 2 and 3 respectively. As the upper element 26 is pivoted to the left, for instance, (FIG. 2) the shoulder 67 and the end 76 of the re-entrant arm 70 closely follow the flange 58 adjacent the lip 62 on the right hand side of the arcuate surface 16. This assures that the upper surface and intermediate surfaces will pivot only about the pivot pin 32 and will not pivot about the pivot pin 30.

On the other hand, when it is desired to pivot the upper surface to the right (FIG. 3), the end 76 of the plate 70 and shoulder 67 trace along the surfaces respectively of flange 58 so that the pivoting will be only about the pivot pin 30.

It should be understood that the re-entrant plate 70 by engaging (through the bearing 74), the underside of the lip 62 serves to hold down the follower end of the upper element 26. Thus, even when the console is pivoted to the extreme positions of FIGS. 2 and 3, there is no tendency for the upper element 26 to pitch forward and permit the console to fall forwardly. Hence, the follower 66 serves not only as a restraining means to restrain the pivoting action of the upper element to a pivoting about only one of the pivot pins 30, 32, but to also keep the rear end of the upper element 26 held down to mantain stability of the assembly even at extreme pivot angles (FIGS. 2, 3).

MODIFICATION

In the modified form of the invention (FIGS. 7 through 14) the support base is generally designated 110. It comprises a rectangular lower element 112 having a frontal margin 114. The lower element 114 is superposed by an upper element 116 which as shown may be generally triangular in shape and which has the frontal margin 118. As shown the frontal margins 114 and 118 are aligned (FIG. 10)

Pivot means are provided and comprise a right pivot pin 120 and a leftward pivot pin 122. The pins 120, 122 are formed with a shank 124 and 126 respectively and a head 128 and 130 respectively. In this form of the invention the pins are each formed in their shank portions with flats 132 and 134 respectively and these flats are lined up so that the flats 132 and 134 of the shank extend perpendicular to the frontal margin 114 of the lower element.

The upper element 116 is formed as shown with a lateral enlargements 116a and 116b respectively, the enlargements having circular openings to receive the pins 120 and 122. The openings 136 and 138 are fitted with C-shaped bushings 136a and 138a of the same diameter as the wide dimension of the shanks 124 and 126. The openings 136 and 138 are countersunk as shown to permit the upper ends of the heads 128, 130 to be on the same plane as the upper surface of the upper element 116. Finally, the extensions 116a and 116b are formed with slots 140 and 142. The slots extend from the lateral openings in the bushings 136a and 138a rearward of the extension and are dimensioned to be slightly larger that the narrow width of the pivot pins across the flats 132, 134. The slots are stepped also to permit passage of the heads 128, 130 respectively.

As shown in FIG. 13 and as with the earlier embodiment, the lower element 112 is formed with a plurality of pockets 150 which include mounts 152 which permit the rotation of ball bearings 154 to comprise anti-friction means between the lower element 112 and upper element 116.

The lower element 112 is formed with arcuate slots 160, 162 which converge at a point 156 (FIGS. 8, 9). These slots have centers at the pivot pins 120, 122 and the side walls of the slots present arcuate surfaces for cooperation with the follower 170 which comprises the rearward arm 172 extending from the upper element 116. The arm 172 has secured to it a downward element 174 which extends through the slots 160, 162 (depending on its position) and is free to move therealong. At its lower end the element 174 is formed with an enlarged head 176 which mounts upward facing freely rotatable ball bearings 178 which engage the undersurface of the lower element 112.

As will be understood, the lower element 112 is appropriately braced from opposite sides of the slots 162, 160 in such a way that the bracing does not interfere with the travel of the head 176.

The operation of the modification has a similar result to that of the earlier described embodiment; namely by pivoting the upper element 116 about a selected pivot pin 128, 130, the upper element 16 may pivot 45° with respect to the lower element (FIGS. 8 and 9). Specifically if it is desired to pivot the upper element 16 to the left (FIG. 8), the rightward end of the upper element 116 is pulled forward. This causes the upper element to pivot about pin 130. Once the pivoting has started, the side portion of the shank 122 engages the wall of the opening 138 in the upper element 116 to assure a single point pivot. At the same time, forward movement of the right hand side of the upper element 116 permits the flattened shank 124 to move out the slot 140 and escape the extension 116a.

Simultaneously, the follower 174 shank moves along the slot 160 serving as an additional assurance that the pivot will be only about the pin 122. Moreover, the head 176 in engaging the underside of the lower element 112 assures that the rear of the upper element 116 will not raise to permit the forward pitching of the upper element. In an identical, but opposite way, the upper element 116 pivoting to the right involves the rotation of the upper element 116 about the opening pin 120 and the tracking of the follower 174 along the arcuate slot 162 to provide assurance of pivoting about the pivot pin 120 only and the holding down of the rear of the upper element 116. At the same time, the extension 116*b* moves forwardly and the pivot pin 122 moves out the slot 142.

Variations and embellishments are within the scope of the invention. For instance, locking means may be provided to lock the upper element 26 in a given position, for instance, the central position shown in FIG. 4 with respect to the lower element 12. Such locking means may take the form of a brake shoe which may be controlled remotely and be operatively disposed on the follower to selectively clamp against the offset 64 lip 62. By this means the controller can be assured that the frontal margins 14, 22, 28 will stay vertically aligned as shown in FIG. 1. Corresponding embellishments are envisioned in the FIGS. 7 through 13 modification.

Thus, the invention is not limited to the embodiments shown but should be thought of as having the scope defined by the following claim language or reasonable equivalents thereof.

I claim:

1. A support base for an air traffic controller's console or the like comprising:
   a. at least two stacked generally planar elements, a lower one adapted to be supported, an upper one adapted to support the console, the elements having aligned coextensive frontal margins with a corner at each frontal end,
   b. pivot means at each corner serving selectively as fixed pivot points for the upper element to permit it to be pivoted with respect to the lower element about said fixed pivot points selectively,
   c. anti-friction means between the upper and lower elements,
   d. restraining means assuring that any pivoting movement between the upper and lower elements will be at the selected pivot points.

2. A support base as claimed in claim 1 wherein a third planar element is provided positioned intermediate the upper and lower elements and one of the pivot means pivots the upper element to the third element and the other of the pivot means pivots the lower element to the third element.

3. A support base as claimed in claim 1 wherein the pivot means each comprise a pin fixed in one of the elements and extending in pivotable relation into an opening in the other element and the opening extends in slot form in a direction to permit one pin to escape the other element as an element pivots about the other pin.

4. A support base as claimed in claim 3 wherein the pins are reduced and flattened inside the openings and the slots are narrower than the openings and are only slightly wider than the flattened section of the pins.

5. A support base as claimed in claim 1 where the restraining means comprise arcuate surface means on one of the elements having sections centered about the two pivot points respectively, and followr means on the other of the elements adapted to ride on the arcuate surface means as the upper element pivots with respect to the lower element.

6. A support base as claimed in claim 5 wherein the surface means is on a raised outward lip on the lower element and the follower means is an inwardly facing U-shaped element, the legs of which straddle the lip.

7. A support base as claimed in claim 5 wherein the arcuate surface is a slot in one of the elements and the follower is a headed finger mounted on the other element and which is disposed in the slot, the head engaging the one element on the opposite side from the other element.

8. A support base for an air traffic controller's console or the like comprising:
   a. three stacked and planar elements, a lower one adapted to be supported, an intermediate element and an upper element adapted to support the console on its upper surface, the elements all having aligned coextensive frontal margins with a corner at each frontal end,
   b. pivot means pivotally connecting the lower element and the intermediate element at a first pivot point adjacent one corner and the upper element and the intermediate element at the other corner,
   c. restraining means assuring that any pivoting movement between the upper and lower elements will be at either one or the other of the pivot means the restricting means comprising arcuate pocket means in one of the elements and having sections centered about the two pivot pints respectively, and tongue means on another of the elements and adapted to ride in the arcuate pocket means as the upper element pivots with respect to the lower element.
   d. anti-friction means between the upper and lower elements.

* * * * *